US00RE34675E

United States Patent [19]

Plueddemann deceased

[11] E Patent Number: Re. 34,675

[45] Reissued Date of Patent: Jul. 26, 1994

[54] COUPLING AGENT COMPOSITIONS

[75] Inventor: Edwin P. Plueddemann deceased, late of Midland, Mich., by Mary Margaret Plueddeman, personal representative

[73] Assignee: Dow Corning Corporation, Midland, Mich.

[21] Appl. No.: 876,990

[22] Filed: May 1, 1992

Related U.S. Patent Documents

Reissue of:

[64] Patent No.: 4,689,085
Issued: Aug. 25, 1987
Appl. No.: 880,528
Filed: Jun. 30, 1986

[51] Int. Cl.[5] ..... C09K 3/00; C07F 7/04; C07F 7/08

[52] U.S. Cl. ..... 106/287.1; 106/287.11; 106/287.13; 106/287.14; 106/287.15; 106/287.16; 528/33; 528/901; 556/431

[58] Field of Search ..... 106/287.14, 287.15, 106/287.19, 287.11, 287.13; 528/33, 901; 556/431, 432, 435, 440; 428/429

[56] References Cited

U.S. PATENT DOCUMENTS

| | | | |
|---|---|---|---|
| 3,816,152 | 6/1974 | Yates | 106/287.1 |
| 4,015,044 | 3/1977 | Rarrey et al. | 428/429 |
| 4,059,473 | 11/1977 | Okani | 428/429 |
| 4,243,718 | 1/1981 | Murai et al. | 428/429 |
| 4,409,266 | 11/1983 | Wieczolrek et al. | 428/429 |
| 4,457,970 | 7/1984 | Des et al. | 428/429 |
| 4,461,867 | 7/1984 | Surprenant | 524/788 |
| 4,489,191 | 12/1984 | Chung | 528/901 |

FOREIGN PATENT DOCUMENTS

| | | |
|---|---|---|
| 66/161475 | 12/1981 | Japan . |
| 60/81256 | 5/1985 | Japan . |
| 60/213902 | 10/1985 | Japan . |

OTHER PUBLICATIONS

Kojima et al, "Synthesis of Bis[3-Trimethoxysilyl Propyl] Compounds and Their Application of Surface Active Agents", (Feb. 1986).

*Primary Examiner*—David Brunsman
*Attorney, Agent, or Firm*—Alexander Weitz; Richard I. Gearhart

[57] ABSTRACT

Coupling agent and primer compositions comprising a conventional silane coupling agent (1), and a disilyl crosslinker compound (II) of the general formula $$(RO)_3SiR'Si(OR)_3$$

where RO denotes a hydrolyzable group, R′ denotes a divalent organic radical, and the weight ratio of (I) to (II) is between 1:99 and 99:1 inclusive.

56 Claims, No Drawings

COUPLING AGENT COMPOSITIONS

Matter enclosed in heavy brackets [ ] appears in the original patent but forms no part of this reissue specification; matter printed in italics indicates the additions made by reissue.

*This is a reissue of Ser. No.* 06/880,528; U.S. Pat. No. 4,689,085.

BACKGROUND OF THE INVENTION

This invention relates to coupling agent compositions comprising a conventional silane coupling agent and a bis(trialkoxysilyl)organo compound, and partially hydrolyzed products of such mixtures. These coupling agent compositions can also be used as primers in the production of laminates and other composite materials.

Conventional silane coupling agents are well known in the plastic forming and composite materials arts for bonding resins to fillers and substrates. Typically as part of the process of producing composite materials, reinforcing fillers are treated with silane coupling agents before being introduced into the uncured resin. The silane coupling agents form a coating on the filler, and the coating interacts with the resin, either chemically or through the formation of interpenetrating polymer networks, to form a strong cohesive bond between the resin and filler. A significant benefit of silane coupling agents is the added hydrolytic stability they provide composite materials.

The particular silane coupling agent which will produce the strongest and most hydrolytically stable composite material depends upon the resin used in said composite. Ordinarily, the silane coupling agent is chosen based upon the functionality of the nonhydrolyzable group attached to the silane, however, some silanes are effective coupling agents with resins even where the silane is relatively unreactive with the resin used in the composite. Recommendations for choosing the most effective coupling agent for a particular filler/resin combination are present in the art.

The performance and cost of silane coupling agents, while adequate, can be improved by the addition of further chemical compounds. U.S. Pat. No. 3,816,152, issued to P. C. Yates Jun. 11, 1974, teaches the addition of silicic and polysilicic acid to organofunctional silanes to lower the cost of coupling agent compositions. While these compositions are effective coupling agents, they do not in all cases provide composites as strong as composites made with organofunctional silane coupling agents alone. Thus, a coupling agent composition more effective than the organofunctional silane alone would be useful in the plastic forming arts.

GENERAL DESCRIPTION

This invention relates to coupling agent and primer compositions comprising a conventional silane coupling agent (I), and a disilyl crosslinker compound (II) of the general formula $$(RO)_3SiR'Si(OR)_3$$

where RO independently denotes a hydrolyzable group, R′ denotes a divalent organic radical, and the weight ratio of the silane coupling agent to the disilyl crosslinker compound is between 1:99 and 99:1 inclusive. The compositions may further include a mutual solvent of the silane coupling agent and the disilyl crosslinker compound.

The compositions of the present invention are effective as both coupling agents and as primers. The compositions of the present invention can be used in a wide range of polymer composite materials including filled systems, laminates, and coatings. The compositions can be used as primer coats between nonparticulate surfaces and polymer coatings, as pretreatments for particulate fillers before compounding, and as additives to filled polymer systems during compounding. The compositions can also be used to treat glass cloth used in laminates.

DETAILED DESCRIPTION OF THE INVENTION

This invention relates to coupling agent and primer compositions comprising a conventional silane coupling agent (I), and a disilyl crosslinker compound (II) of the general formula $$(RO)_3SiR'Si(OR)_3 \qquad \text{(i)}$$

where RO denotes an alkoxy radical with 1 to 8 carbon atoms, or some other hydrolyzable radical such as an alkoxyalkoxy radical or an acetoxy radical, R′ denotes a divalent organic radical which is less than 15 bond lengths between the two silyl groups, and the weight ratio of the silane coupling agent to the disilyl crosslinker compound is between 1:99 and 99:1 inclusive. The compositions may further include a mutual solvent of the silane coupling agent and the disilyl crosslinker compound.

Also within the scope of the present invention are partially hydrolyzed mixtures and solutions of silane coupling agents and disilyl crosslinker compounds. For instance, a mixture of 10 grams of a silane coupling agent, 10 grams of a disilyl crosslinker, 75 grams of a mutual solvent and 5 grams of water would be within the scope of the present invention. The silane coupling agent and the disilyl crosslinker compound would be partially cohydrolyzed in such a solution.

Various conventional silane coupling agents (I) can be used in conjunction with the the crosslinkers of the present application. Generally, silane coupling agents are of the formula $$A_{(4-n)}SiY_n$$

where A is a monovalent organic radical, Y is a hydrolyzable radical, and n is 1, 2, or 3 (most preferably 3). A can be various types of organic radicals including alkyl or aryl radicals and various functional radicals such as methacryloxy, methacryl, epoxy, chloroalkyl, carboxyl, vinyl or allyl, styryl, amino, diamino, azo, and azido radicals. Y radicals hydrolyze in the presence of water and include acetoxy radicals, alkoxy radicals with 1 to 6 carbon atoms, alkoxyalkoxy radicals with 2 to 8 carbon atoms, and chloro radicals.

Specific silane coupling agents within the scope of the claimed compositions include N-(2-aminoethyl)-3-aminopropyltrimethoxysilane, 3-methacryloxypropyltrimethoxysilane, 3[2(vinylbenzyiamino) ethylamino]-propyltrimethoxysilane, 3-glycidoxypropyltrimethoxysilane, triacetoxyvinylsilane, tris-(2-methoxyethoxy)-vinylsilane, 3-chloropropyltrimethoxysilane, 1-trimethoxysilyl-2-(p,m-chloromethyl)phenyl-ethane, 3-chloropropyltriethoxysilane, N-(aminoethylaminomethyl)phenyltrimethoxysilane, N-(2-aminoethyl)-3-aminopropyl tris(2-ethylhexoxy)silane, 3-aminopropyltrimethoxysilane, trimethoxysilylpropyldiethylenetriamine, beta (3,4-epoxycyclohexyl)ethyltrimethoxysilane, 3-mercaptopropyltrimethoxysilane, 3-mercaptotriethoxysilane, 3-mercaptopropylmethyldimethoxysilane, bis(2-hydroxyethyl)-3-aminopropyltrimethoxysilane. 1,3 divinyltetramethyidisilazane, vinyltrimethoxysilane, 2-(diphenylphosphino)ethyltriethoxysilane, 2-methacryloxyethyldimethyl[3-trimethoxysilylpropyl)ammonium chloride, 3-isocyanatopropyldimethylethoxysilane, N-(3-acryloxy-2-hydroxypropyl)-3-aminopropyltriethoxysilane, vinyl tris(t-butylperoxy)silane, 4-aminobutyltriethoxysilane, methyltrimethoxysilane, ethyltrimethoxysilane, phenyltrimethoxysilane, and phenyltriacetoxysilane.

Other silane compounds which are considered silane coupling agents for the purpose of the present application include methyltrimethoxysilane, phenyltrimethoxysilane, ethylorthosilicate, phenyltriethoxysilane and n-propylorthosilicate.

Azide functional silanes, of the general formula $$Y_3SiR'''SO_2N_3$$

where Y denotes a hydrolyzable group such as an alkoxy, an alkylalkoxy or a chloro radical, and R''' denotes a divalent organic radical, are also within the scope of the invention *and* can also be used.

The most preferred silane coupling agents are those which are commercially available and which are recognized by those skilled in the art as being effective coupling agents. In particular, the most preferred silane coupling agents include N-(2-aminoethyl)-3-aminopropyltrimethoxysilane, 3[2(vinylbenzylamino) ethylamino]propyltrimethoxysilane, 3-methacryloxypropyltrimethoxysilane, 3-glycidoxypropyltrimethoxysilane, triacetoxyvinylsilane, tris-(2-methoxyethoxy)-vinyisilane, 3-chloropropyltrimethoxysilane, 3-aminopropyltrimethoxysilane, vinyltrimethoxysilane, mercaptopropyltrimethoxysilane, mercaptopropyltriethoxysilane and the azide functional silanes of the formula [$X_3Sir'''SO_2N_3$,] $X_3SiR'''SO(_2N_3$ where X denotes a hydrolyzable group such as an alkoxy, an alkylalkoxy or a chloro radical, and R''' denotes a divalent organic radical.

The most preferred silane coupling agents are commercially available. The other silane coupling agents are available commercially, or their preparation is known in the art.

The disilyl crosslinker compounds (II) of the present invention are represented by formula (i), wherein RO denotes a hydrolyzable radical, and R' denotes a divalent organic radical. For the purposes of this application, divalent organic radicals is deemed to include divalent organosilicon radicals. Within the scope of the present invention R' can vary and includes alkylene radicals with 1 to 8 carbon atoms, or divalent radicals of the following formulae $$-(CH_2)_x\underset{\underset{(CH_3)_2}{|}}{Si}-O-\overset{\overset{(CH_3)_2}{|}}{Si}(CH_2)_y-, \quad \text{(a)}$$

-continued $$-(CH_2)_x\underset{\underset{(CH_3)_2}{|}}{Si}-\overset{\overset{(CH_3)_2}{|}}{Si}(CH_2)_y-, \quad \text{(b)}$$

$$-(CH_2)_xOOCCH{=}CHCOO(CH_2)_y- \quad \text{(c)}$$

(both cis- and trans-), where x and y are 1 to 5,

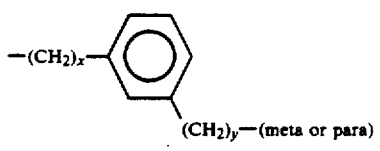

where x and y are between 0 and 3 inclusive, $$-(CH_2)_s\underset{\underset{O}{|}}{\overset{\overset{CH_3}{|}}{Si}}-O-\underset{\underset{O}{|}}{\overset{\overset{CH_3}{|}}{Si}}(CH_2)_t- \quad \text{(e)}$$
$$(CH_3O)_3Si(CH_2)_u\underset{\underset{CH_3}{|}}{Si}-O-\underset{\underset{CH_3}{|}}{Si}(CH_2)_vSi(OCH_3)_3$$

where s, t, u, and v are 1 to 3 inclusive.

Particular divalent organic radicals include, but are not limited to, divalent radicals of the [follow] *following* formulae $$-(CH_2)_2\underset{\underset{(CH_3)_2}{|}}{Si}-O-\overset{\overset{(CH_3)_2}{|}}{Si}(CH_2)_2-,$$

$$-(CH_2)_2\underset{\underset{(CH_3)_2}{|}}{\overset{\overset{(CH_3)_2}{|}}{Si}}-Si(CH_2)_2-,$$

$$-(CH_2)_3OOCCH{=}CHCOO(CH_2)_3-$$

(both cis and trans), and $$-(CH_2)_2\underset{\underset{O}{|}}{\overset{\overset{CH_3}{|}}{Si}}-O-\underset{\underset{O}{|}}{\overset{\overset{CH_3}{|}}{Si}}(CH_2)_2-$$
$$(CH_3O)_3Si(CH_2)_2\underset{\underset{CH_3}{|}}{Si}-O-\underset{\underset{CH_3}{|}}{Si}(CH_2)_2Si(OCH_3)_3$$

The R' radical can also be methylene, ethylene, propylene, hexylene, and meta or para phenylene radicals.

It is important in the practice of the invention that the divalent organic radical not be bulky. There should be less than 15 bond lengths in the chain linking the silyl radicals. The most preferred radicals have less than 10 bond lengths between the silyl radicals.

The most preferred R' radicals are methylene, ethylene, meta- or para- phenylene and the trans isomer of formula [d] *c* above.

RO denotes hydrolyzable radicals such as alkoxy radicals with one to eight carbon atoms, alkoxyalkoxy radicals with two to ten carbon atoms, a hydroxy radical, or an acetoxy radical.

The syntheses of the disilyl crosslinker compounds are known in the art. The disilylalkyl compounds can be synthesized by reacting choloralkytrialkoxysilane with tetraalkoxysilane (represented by the formula $SiX_4$ where X is an alkoxy group) in the presence of lithium.

The bis(trimethoxysilyl)benzene compounds can be synthesized by reducing bis(trichlorosilyl)benzene with lithium aluminum halide followed by methanolysis as described in Preparation and Characterization of Disilylbenzene and Bis(trimethoxysilyl)benzene, Bilow, et al., J. Org. Chem. 26(3) 929, 1961.

The disilyl crosslinker compounds corresponding to formula (d) above can be synthesized by any of the means taught in U.S. Pat. No. 3,179,612, especially by the method taught in Example 2 of said patent.

The disilyl crosslinker compounds corresponding to formula (c) can be synthesized by reacting polyamines with chloroalkylsilanes according to the method taught in U.S. Pat. No. 4,448,694.

The coupling agent compositions of the present invention can be used as coupling agents in a wide variety of composite materials. A wide range of fillers and resins can be used in these composites. It is thought that the present compositions can be used with any combination of filler and resin, if the appropriate conventional silane coupling agent is used in the composition. The art provides useful references teaching specific silane coupling agents for use in a particular resin/filler composite combination. For instance, Petrarch Systems, Inc. Silicon Compounds Register and Review, Petrarch Systems, Inc., Bristol, Pa. 19007, 1985 provides a useful guide in choosing silanes for particular resins, as does A Guide to Dow Corning Silane Coupling Agents, Dow Corning Corporation, Midland, Mich. 48640, 1985.

Fillers, both particulate and fibrous, which could be used in composites employing the coupling agent compositions of the present invention include siliceous materials such as glass, quartz, ceramic, asbestos, silicone resin and glass fibers, metals such as aluminum, steel, copper, nickel, magnesium, and titanium, metal oxides such as MgO, $Fe_2O_3$, and $Al_2O_3$, and metal fibers and metal coated glass fibers.

The ratio of silane coupling agent to disilyl crosslinker can vary widely. The weight ratio of silane to disilyl crosslinker can vary from 1:99 to 99: 1, inclusive, although their ratio is preferably within the range of about 1:9 to 9:1. The most preferable weight ratios for polyester glass laminates is about 2:9 to 1:9.

The silane coupling compositions of the present invention can further comprise a solvent capable of solubilizing both the conventional silane coupling agent and the disilyl crosslinker compound. Typically such solvents include lower alcohols such as methanol, butanol or isopropanol. Water can also be used as a solvent, but the stability of such solutions is much more limited than the solutions made with alcohols. Small portions of water can be added to the coupling agent solutions in order to hydrolyze the conventional silane coupling agent and the disilyl crosslinker.

The solids contents of the coupling agent compositions of the present invention varies from 100 weight percent in pure mixtures to as little as 0.1 weight percent or less in very dilute solids solutions.

The following examples demonstrate particular embodiments of the present invention. Some of the examples are comparative examples offered to demonstrate the effectiveness of the present invention relative to the prior art. The examples do not delineate the full scope of the invention.

EXAMPLE 1

This example demonstrates the effectiveness of the present invention in adhering polymeric materials to metal. Cold rolled steel and titanium surfaces were primed with a 10 weight percent isopropanol solution of a conventional silane coupling agent, 3-methacryloxypropyltrimethoxysilane (A). Steel and titanium surfaces were also primed with a 10 weight percent solution of a mixture of I weight part hexamethoxy-1,2-disilylethane and 10 weight parts of 3-methacryloxypropyltrimethoxysilane (B). Commercially available, crosslinkable polyethylene vinylacetate terpolymer was adhered to unprimed steel and titanium surfaces and to the primed steel and titanium surfaces by applying the polymer under low pressure at 130° C. Upon cooling to room temperature, the adhesion of the polymer to the metal surface was determined by measuring the force applied 90 degrees to the metal surface required to peel the polymer film from the metal. Adhesion of the polymer to the metal was also measured after the samples had been immersed in water at 80° C. for 2 hours and cooled to room temperature. The results are reported in Table 1.

TABLE 1

| | Peel/Strength (lbs./inch) | | | |
|---|---|---|---|---|
| | Titanium | | C.R. Steel | |
| Primer | Initial | Immersed | Initial | Immersed |
| None | Nil | Nil | Nil | Nil |
| A | c | 0.15 | c | 4.0 |
| B | c | 6.15 | c | c |

Note: c denotes cohesive failure of the polymer at greater than 16 lb./inch.

The results show the increased effectiveness of the present invention in adhering polyethylene copolymers to primed metal surfaces versus conventional silane coupling agents. Primer B, an embodiment of the present invention, more effectively adhered ethylene vinylacetate terpolymer to titanium than the prior art coupling agent A, both initially and after immersion in 80° C. water for 2 hours. Primer B improved the adhesion of the polymer to cold rolled steel to the extent that even after water immersion the cause of failure of the composite was cohesive failure of the polymer film rather than failure of the bond between the film and the metal surface.

EXAMPLE 2

This example illustrates the effectiveness of the invention in adhering various polymers to glass slides. 10 weight percent solids, methanol solutions encompassed within the present invention were made by diluting 9 weight parts of 3[2(vinylbenzylamino)-ethylamino]-propyltrimethoxysilane coupling agent with 1 weight part of one of the disilyl crosslinker compounds listed below:

$(CH_3O)_3SiCH_2CH_2Si(OCH_3)_3$ 1.

$(CH_3O)_3SiCH_2CH_2CH_2Si(OCH_3)_3$ 2.

$(CH_3O)_3Si(CH_2)_6Si(OCH_3)_3$ 3.

-continued

4.

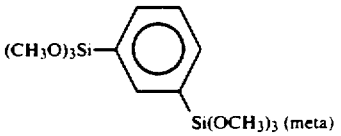

5.

$$(CH_3O)_3SiCH_2CH_2\underset{\underset{CH_3}{|}}{\overset{\overset{CH_3}{|}}{Si}}-O-\underset{\underset{CH_3}{|}}{\overset{\overset{CH_3}{|}}{Si}}CH_2CH_2Si(OCH_3)_3$$

6.

$$(CH_3O)_3Si(CH_2)_2\underset{\underset{CH_3}{|}}{\overset{\overset{CH_3}{|}}{Si}}-\underset{\underset{CH_3}{|}}{\overset{\overset{CH_3}{|}}{Si}}(CH_2)_2Si(OCH_3)_3$$

7.

$$(CH_3O)_3Si(CH_2)_3OOCCH{=}CHCOO(CH_2)_3Si(OCH_3)_3$$
(trans)

8

$$\begin{array}{c} (CH_3O)_3Si(CH_2)_2\underset{\underset{CH_3}{|}}{\overset{\overset{CH_3}{|}}{Si}}-O-\underset{\underset{CH_3}{|}}{\overset{\overset{CH_3}{|}}{Si}}(CH_2)_2Si(OCH_3)_3 \\ \underset{\underset{CH_3}{|}}{\overset{\overset{O}{|}}{Si}}-O-\underset{\underset{CH_3}{|}}{\overset{\overset{O}{|}}{Si}} \\ (CH_3O)_3Si(CH_2)_2 \qquad (CH_2)_2Si(OCH_3)_3 \end{array}$$

Comparative example primers were made with mixtures comprising 9 weight parts 3[2(vinylbenzylamino)ethylamino]propyltrimethoxysilane, and I weight part of one of the following silane crosslinkers:

9 $C_6H_5Si(OCH_3)_3$ $Si(OCH_2CH_3)_4$.

10. diluted to 10 weight percent solids in methanol. The primers were partially hydrolyzed by adding 5 weight percent water to the solutions. Glass microscope slides were coated with the primers and dried. Three types of polymers were applied to the primed surfaces and the 90 degree peel strength of the polymer films was measured after immersing the sample in water. The three polymers used were a crosslinkable ethylene vinylacetate copolymer resin (C-EVA) sold be Springborn Laboratories of Enfield, Conn. as EMA TM 15-295; a thermoplastic ethylene vinylacetate terpolymer (EVA) sold by E. I. du Pont de Nemours & Company, Inc., Wilmington, DE, as CXA-2022 TM; and a styrene-butadiene block copolymer (SB) sold by Shell as Kraton TM 1102. The crosslinked ethylene vinylacetate (C-EVA) samples were immersed in water at 70° C. for 2 hours. The EVA samples were immersed in 70° C. for 1 and 4 hours before being measured. The SB polymer was immersed in

TABLE 2

| Primer Additive | (Peel/Strength (lb./inch) Polymer C-EVA | EVA 1 Hour | EVA 4 Hours | [CB]SB |
|---|---|---|---|---|
| None* | 0.4 | 7.0 | 0.4 | nil |
| 1 | 6.6 | 13.6 | 1.8 | 11.0 |
| 2 | 3.5 | 9.9 | 0.7 | 7.7 |
| 3 | 2.6 | 5.0 | 0.7 | 0.3 |
| 4 | 8.8 | 9.0 | 1.3 | >18.0 |
| 5 | 4.0 | 4.8 | 1.1 | 11.0 |
| 6 | 1.1 | 2.6 | nil | 0.2 |
| 7 | 7.5 | >18.0 | 7.0 | >18.0 |
| 8 | 1.1 | 6.4 | 1.3 | 0.7 |
| 9* | 4.6 | 9.5 | 0.7 | 0.3 |
| 10* | 4.6 | 2.6 | 1.0 | 6.2 |

*The primer was a 10 weight percent solids solution of partially hydrolyzed 3[2(vinylbenzylamino)ethylamino]propyltrimethoxysilane with no crosslinker additive.

The results demonstrate that mixtures of partially hydrloxyzed silane coupling agents with disilyl crosslinkers are effective primers. All of the mixtures within the scope of the invention showed improved adhesion between glass slides and at least one of the three polymer systems. Primers 1, 4, and 7 showed across the board improved adhesion relative to the adhesion promoters known in the art (comparative primers 9 and 10). Primers 2 and 5 showed improved adhesion with certain polymers over the prior art.

EXAMPLE3

This example demonstrates the effectiveness of the present invention as a coupling agent in Novacite filled polyester resin castings. 40 weight percent methanol solutions of mixtures comprised of 10 weight parts conventional silane coupling agent and 1 weight part of the crosslinking agents of Example 2 were made. Fifty parts of Novacite TM, a natural microform of low quartz, (DAPER TM - Malvern Minerals) was mixed with 50 parts of a polyester resin sold as Co Resyn TM 5500 by Interplastic Corp., Minneapolis, Minn., and 0.5% parts of benzoyl peroxide. 2.5 weight parts of the various coupling agent mixtures were added to 100 weight parts of the uncured resin/Novacite filler mixture. After thorough mixing and devolatilization, the resulting mixtures were cast into 7 mm internal diameter test tubes and allowed to cure overnight. Flexural strengths of dry samples and of samples boiled in water for 24 bours were measured. The flexural strength of the castings was measured as the force required to break a sample with a 3 point loading over a 2 inch span. Several composite rods were made with silane coupling agents without crosslinkers, i.e. no disilyl compounds were used. The results of these tests are reported in Table 3. Total silane compound composition for each sample was 0.5 weight percent based on filler.

TABLE 3

| Coupling Agents and Additive | Flexural Strength of Castings (PSI) Dry | 24 Hr. Boil |
|---|---|---|
| None | 12,800 | 9,800 |
| Vinyltrimethoxysilane | 15,400 | 11,900 |
| A* | 18,800 | 14,700 |
| B | 23,100 | 18,200 |
| C* | 20,700 | 16,500 |
| D | 21,100 | 18,100 |
| E | 18,900 | 18,600 |
| F | 20,000 | 18,600 |
| G | 21,000 | 19,800 |
| H | 17,800 | 17,300 |

TABLE 3-continued

| Coupling Agents and Additive | Flexural Strength of Castings (PSI) Dry | 24 Hr. Boil |
|---|---|---|
| I | 21,000 | 18,500 |
| J* | 18,000 | 17,200 |
| K* | 19,700 | 17,500 |

Note: *denotes comparative example.

Sample A was prepared with a solution of 3-methacryloxypropyltrimethoxysilane. Sample B was prepared with a mixture of 9 parts of the silane of Sample A and 1 part of the disilyl crosslinker hexamethoxy-1,2-disilylethane. Samples C-1 used the silane coupling agent 3[2(vinylbenzylamino)ethylaminopropyltrimethoxysilane. Sample C used the coupling agent alone, whereas samples D-I used 9 parts of the coupling with 1 part of one of the disilyl crosslinker compounds of Example 2. Sample D used disilyl crosslinker 1. Sample E used 2; Sample F used 3; Sample G used 4; Sample H used 5; and, Sample I used 7. Samples J and K used the known crosslinker compounds 9 and 10 respectively from Example 2.

The results of the test show that all of the combinations of silane coupling agent and disilyl crosslinker encompassed by the present invention (Samples B, and D through I showed increased dry and boiled flexural strengths relative to the samples without a coupling agent or crosslinker. All of the invention samples showed better flexural strengths than composites made with vinyltrimethoxysilane.

The samples employing disilyl crosslinkers and silane coupling agents showed increased hydrolytic stability, i.e. after boiling the composites were stronger than samples which employed silanes alone.

EXAMPLE 4

This example illustrates the effectiveness of one embodiment of the present invention as a primer for epoxy resins to glass. 20 weight percent solids, methanol solutions were made and used as primers for clean glass slides. Primer A employed the silane coupling agent N-(2-aminoethyl)-3-aminopropyltrimethoxysilane alone. Primer B employed the same silane with hexamethoxy-1,2-disilylethane in a ratio of 9 weight parts silane to 1 weight part disilyl compound. Primers C, D and E used the same constituents as Primer B, but the weight ratio of silane to disilyl compound for each was 4 to 1, 1 to 1 and 1 to 9, respectively.

A two component epoxy mixture comprised of equal weights of DER-330 TM, a commercial bisphenyldiglycocidal ether resin sold by Dow Chemical, Midland, Mich., and Versamid (®), a polyamide amine curing agent sold by General Mills, 140 was coated on the primed glass slide surfaces and cured for six days at room temperature. The adhesion of the epoxy to the slides was tested upon drying and after boiling the samples in water for 2 hours. Samples which adhered so tenaciously to the glass slide that the epoxy could not be removed were rated excellent. Samples which required significant efforts to remove the epoxy were rated good, samples which required little effort were rated fair, and samples where the epoxy did not adhere to the glass were rated poor. The results are reported in Table 4.

TABLE 4

| Silane/Disilyl Weight Ratio | Adhesion to Glass | |
|---|---|---|
| | Dry | After 2 Hour Boil |
| No Primer | Good | Nil |
| 1/0 | Excellent | Poor |
| 9/1 | Excellent | Good |
| 4/1 | Excellent | Fair |
| 1/1 | Excellent | Poor |
| 1/9 | Excellent | Excellent |

The results show that the mixtures of the present invention when used as primers adhere epoxy to glass better than silane coupling agent solution primers. The results also show that the best results are obtained when the silane coupling agent and the disilyl crosslinker are used in unequal weight ratios.

EXAMPLE 5

This example illustrates the effectiveness of the present invention as a primer for epoxy resin based air dried paints on glass and cold rolled steel surfaces. A commercially availabl epoxy floor paint was painted and dried on primed surfaces, and the adhesion of the paint was tested after air drying the samples for 3 days. The 90 peel strength of the dried paint film was measured upon drying, after 2 hours of water immersion, and after 1 day of water immersion. Primer A was a 50 weight percent solids, methanol solution of N-(2-aminoethyl)-3-aminopropyltrimethoxysilane and 5 weight percent water. Primer B was a mixture of 10 weight parts of an epoxy resin sold as DER 667 by Dow Chemical Corp. (having a molecular weight of ~2000), and 1 weight part N-(2-aminoethyl)-3-aminopropyltrimethoxysilane as a 5 weight percent solids solution. Primer C was the same composition as Primer B with the addition of 1 weight percent hexamethoxy-1,2-disilylethane. The results are reported in Table 5.

TABLE 5

| Peel Strength of Epoxy to Primed Surfaces (lb./inch) | | | | | | |
|---|---|---|---|---|---|---|
| | Glass | | | Cold Rolled Steel | | |
| | | Wet | | | | |
| Primer | Dry | 2 Hr. | Wet 1 Day | Dry | Wet 2 Hr. | Wet 1 Day |
| None | 0.3 | Nil | Nil | 0.6 | Nil | Nil |
| A | c | 1.1 | Nil | c | 1.8 | 3.0 |
| B | c | c | 4.4 | c | c | 3.0 |
| C | c | c | c | c | c | c |

In the Table, c denotes cohesive failure of the epoxy, indicating that the bond between the epoxy and the surface was stronger than the epoxy coat itself. The results demonstrate that addition of the disilyl crosslinker to primer composition B, to make primer composition C, improves the adhesion of the epoxy paint to both glass and cold rolled steel surfaces, particularly in regards to the epoxy paint's resistance to water immersion.

EXAMPLE 6

This example illustrates the handling properties of the compositions of the present invention on treated glass cloth. 0.5 weight percent solutions of the following mixtures were made: a 9/1 weight mixture of 3-methacryloxypropyltrimethoxysilane and hexamethoxy-1,2-disilylethane in water acidified with 0.1 weight percent acetic acid (A); and 3-methacryloxy-propyltrimethoxysilane in water acidified with 0.1 percent acetic acid (B). Heat cleaned glass cloth was treated with each solution and the treated cloths were measured for wet out time for various liquids, and judged for hand (how the treated cloth felt). The cloth treated with a composition of the present invention, Solution A, was stiff, whereas treatment with the silane alone provided a soft cloth. The wettability of the cloths is reported in Table 6.

TABLE 6

| Wettability of Treated Heat Cleaned Glass Cloth | | | | |
|---|---|---|---|---|
| | | Wet-Out Time of 1 Drop of Liquid | | |
| Treatment Solution | Water | Mineral Oil | Liquid Epoxy | Liquid Polyester |
| A | 1 min. | 2 min. | 4 min. | 1 min. |
| B | 8 sec. | 3 min. | 9 min. | 1 hour |

Although the cloth treated with a composition of the present invention is stiffer than the cloth treated with the silane alone, and has a longer wet-out time for water, the cloth treated with the invention composition had significantly better wet-out times for the organic liquids tested. Since composites made with glass cloth are typically made with epoxy or polyester resins, better wet-out times with these polymers should provide better quality composite products.

EXAMPLE 7

This example demonstrates the effectiveness of the coupling agent compositions of the present invention to act as effective coupling agents in polyester fiberglass laminates. A 0.2 weight percent solids in water solution of the following mixtures was made: 3-methacryloxypropyltrimethoxysilane (A); 9 weight parts 3-methacryloxypropyltrimethoxysilane and 1 weight part hexamethoxydisilylethane (B); 3 parts 3-methacryloxypropyltrimethoxysilane and 1 part hexamethoxydisilylethane (C); and 1 part 3-methacryloxypropyltrimethoxysilane and 1 part hexamethoxydisilylethane (D). All of the solutions were adjusted to pH 4 with acetic acid. Heat cleaned glass cloth, sold by Burlington Fibers as 7781 Glass Cloth with 112 finish, was impregnated with the above solutions, air dried for 30 minutes, and oven dried at 110° C. for 7 minutes. The cloth was then made into 14 ply laminates with polyester resin. The resin used, a room temperature curing unsaturated polyester resin, was ATLOC®400 ACI sold by ICI Americas with 1.25 weight percent methylethylketone peroxide added to initiate the cure of the resin at room temperature. The liquid polyester resin was applied to each layer of the laminate and allowed to fully wet the cloth. The 14 ply laminate was placed in a press while curing to maintain a thickness of 0.125 inch in order to insure a glass content of the final laminate of about 65 percent.

The flexural strength of each sample was tested dry, and after boiling in water for 24 hours and 72 hours according to accepted test procedures. The results are reported in Table 7.

TABLE 7

| Flexural Strength (PSI) | | | |
|---|---|---|---|
| Coupling Agent | Dry Flex | 24 Hour Boil | 72 Hour Boil |
| None | 63,000 | — | 22,000 |
| A | 76,000 | 60,000 | — |
| B | 73,000 | 61,000 | — |
| C | 76,000 | 57,000 | — |
| D | 70,000 | 42,000 | 37,000 |

The results show that the laminates made according to the present invention have approximately the same dry strength as the laminates made with the silane coupling agent despite the fact that less silane coupling agent is used.

What is claimed is:

1. A [comprising] *coupling agent and primer mixture consisting essentially of:*

(I) a silane coupling agent; [and]

(II) a disilyl crosslinker compound represented by the general formula $$(RO)_3SiR'Si(OR)_3$$

wherein RO denotes an alkoxy radical having 1 to 8 carbon atoms, R' is selected from alkylene groups having 1 to 9 carbon atoms,

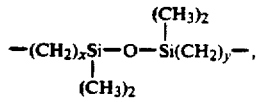

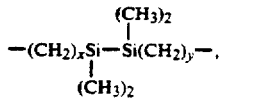

$$-(CH_2)_xOOCCH{=}CHCOO(CH_2)_y-,$$

in which x and y are 1 to 5[.] ,

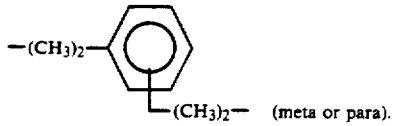

in which x and y are between 0 and 3 inclusive, or

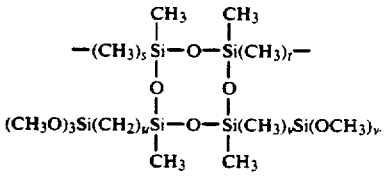

in which s, t, u, and v are 1 to 3 inclusive and wherein the weight ratio of (I) : (II) is between 1:99 and 99:1 inclusive; *and* a solvent mutually compatible with said coupling agent *(I) and said disilyl crossliner compound (II), whereby said mixture is effective as both a coupling agent and a primer.*

2. The composition of claim 1 wherein the R' radical of the disilyl crosslinker compound is an alkylene radical with 1 to 8 carbon atoms.

3. The composition of claim 2 wherein the R' radical of the disilyl crosslinker compound is a methylene radical.

4. The composition of claim 2 wherein the R' radical of the disilyl crosslinker compound is an ethylene radical.

5. The composition of claim 2 wherein the R' radical of the disilyl crosslinker compound is a propylene radical.

6. The composition of claim 2 wherein the R' radical of the disilyl crosslinker compound is a hexylene radical.

7. The composition of claim 1 wherein said divalent organic radical, R', of said disilyl crosslinker compound is represented by the formula $$-(CH_2)_xOOCCH{=}(CHCOO(CH_2)_y-$$

where x and y have values of 1 to 5.

8. The composition of claim 7 wherein the R' radical of said disilyl crosslinker compound is [$-(CH_2)_3OOCCH{=}CHCOO(CH_2)_3-$] $-(CH_2)_3OOCCH{=}CHCOO(CH_2)_3-$. [and wherein the composition further comprises a solvent mutually compatible with said coupling agent (I) and said disilyl crosslinker compound (II).]

9. The composition of claim 1 wherein the divalent organic radical of said disilyl crosslinker compound is of the general formula

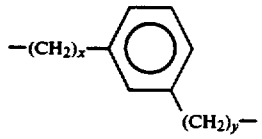

where the value of x and y is between 0 and 3 inclusive, the two alkylene radicals are positioned either meta or para on the benzene ring, [and wherein the composition further comprises a solvent mutually compatible with said coupling agent (I) and said disilyl crosslinker compound (II)].

10. The composition of claim 9 wherein the value of x and y is zero.

11. The composition of claim 1 wherein the R' radical of the disilyl crosslinker compound is represented by the general formula

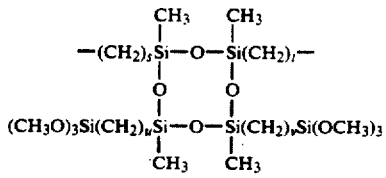

where s, t, u, and v have values between 1 and 3 inclusive[, *and and wherein the composition further comprises a solvent mutually compatible with said coupling agent (I) and said disilyl crosslinker compound (II)*].

12. The composition of claim 2 wherein the silane coupling agent is an aminofunctional silane coupling agent chosen from the group consisting of N-(2-aminoethyl)-3-aminopropyltrimethoxysilane,(aminoethylaminomethyl) phenyltrimethoxysilane, N-(2-aminoethyl)-3-aminopropyl tris(2-ethylhexoxy) silane, 3-aminopropyltrimethoxysilane, trimethoxysilylpropyldiethylenetriamine, 3-aminopropyltrimethoxysilane, aminopropyltriethoxysilane, bis(2-hydroxyethyl)-3-aminopropyltrimethoxysilane, and 4-aminobutyltriethoxysilane.

13. The composition of claim 12 wherein the silane coupling agent is N-(2-aminoethyl)-3-aminopropyltrimethoxysilane[, and the composition further comprises a mutual solvent for said disilyl crosslinker and coupling agent].

14. The composition of claim 2 wherein the silane coupling agent is a methacrylic functional couplingagent chosen from the group consisting of 3-methacryloxypropyltrimethoxysilane, and 2-methacryloxyethyldimethyl[3-trimethoxysilylpropyl]ammonium chloride.

15. The composition of claim 14 wherein the silane coupling agent is 3-methacryloxypropyl-trimethoxysilane[, and the composition further comprises a mutual solvent for said disilyl crosslinker and coupling agent].

16. The composition of claim 2 wherein the silane coupling agent is a epoxy functional coupling agent chosen from the group consisting of 3-glycidoxypropyltrimethoxysilane, and beta (3,4 epoxycyclohexyl) ethyltrimethoxysilane[, and where the composition further comprises a mutual solvent for said disilyl crosslinker and coupling agent].

17. The composition of claim 2 wherein the silane coupling agent is a vinyl functional coupling agent chosen from the group consisting of 3[2(vinyl benzylamino) ethylamino]propyltrimethoxysilane, triacetoxyvinylsilane, tris-(2-methoxyethoxy)vinylsilane, vinyltrimethoxysilane, and vinyl tris(t-butylperoxy)silane[, and where the composition further comprises a mutual solvent for said disilyl crosslinker and coupling agent].

18. The composition of claim 2 wherein the silane coupling agent is a halo-organic radical functional coupling agent chosen from the group consisting of 3-chloropropyltrimethoxysilane, and 3-chloropropyltriethoxysilane, 1-trimethoxysilyl-2-(p,m-chloromethyl)-phenyl-ethane, and where the composition further comprises a mutual solvent for said disilyl crosslinker and coupling agent.

19. The composition of claim 18 where the haloorganic radical is 3-chloropropyltrimethoxysilane.

20. The composition of claim 2 wherein the silane coupling agent is a mercapto functional coupling agent chosen from the group consisting of mercaptopropyltrimethoxysilane, mercaptopropyltriethoxysilane, 3-mercaptopropylmethyltrimethoxysilane, and 3-mercaptopropylmethyidimethoxysilane[, and where the composition further comprises a mutual solvent for said disilyl crosslinker and coupling agent].

21. The composition of claim 3 wherein the silane coupling agent is an aminofunctional silane coupling agent chosen from the group consisting of N-(2-aminoethyl)-3-aminopropyltrimethoxysilane,(aminoethylaminomethyl) phenyltrimethoxysilane, N-(2-aminoethyl)-3-aminopropyl tris(2-ethylhexoxy) silane, 3-aminopropyltrimethoxysilane, trimethoxysilylpropyldiethylenetriamine, 3-aminopropyltrimethoxysilane, aminopropyltriethoxysilane, Bis(2-hydroxyethyl)-3-aminopropyltrimethoxysilane, and 4-aminobutyltriethoxysilane.

22. The composition of claim 21 wherein the silane coupling agent is N-(2-aminoethyl)-3-aminopropyltrimethoxysilane[, and the composition further comprises a mutual solvent for said disilyl crosslinker and coupling agent].

23. The composition of claim 3 wherein the silane coupling agent is a methacrylic functional coupling agent chosen from the group consisting of 3-methacryloxypropyltrimethoxysilane, and 2-methacryloxyethyldimethyl[3-trimethoxysilylpropyl]ammonium chloride.

24. The composition of claim 23 wherein the silane coupling agent is 3-methacryloxypropyl-trimethoxysilane[, and the composition further comprises a mutual solvent for said disilyl crosslinker and coupling agent].

25. The composition of claim 3 wherein the silane coupling agent is a epoxy functional coupling agent chosen from the group consisting of 3-glycidoxypropyltrimethoxysilane, and beta (3,4 epoxycyclohexyl) ethyltrimethoxysilane[, *and where the composition further comprises a mutual solvent for said disilyl crosslinker and coupling agent*].

26. The composition of claim 3 wherein the silane coupling agent is a vinyl functional coupling agent chosen from the group consisting of 3[2(vinyl benzylamino) ethylamino]propyltrimethoxysilane, triacetoxyvinylsilane, tris-(2-methoxyethoxy)vinylsilane, vinyltrimethoxysilane, and vinyl tris(t-butylperoxy)silane[, and where the composition further comprises a mutual solvent for said disilyl crosslinker and coupling agent].

27. The composition of claim 3 wherein the silane coupling agent is a halo-organic radical functional coupling agent chosen from the group consisting of 3-chloropropyltrimethoxysilane, and 3-chloropropyltriethoxysilane, 1-trimethoxysilyl-2-(p,m-chloromethyl)-phenyl-ethane.

28. The composition of claim 27 where the haloorganic radical is 3-chloropropyltrimethoxysilane[, and the composition further comprises a mutual solvent for said disilyl crosslinker and coupling agent].

29. The composition of claim 3 wherein the silane coupling agent is a mercapto functional coupling agent chosen from the group consisting of mercaptopropyltrimethoxysilane, mercaptopropyltriethoxysilane, 3-mercaptopropylmethyltrimethoxysilane, and 3-mercaptopropylmethyldimethoxysilane[, and where the composition further comprises a mutual solvent for said disilyl crosslinker and coupling agent].

30. The composition of claim 4 wherein the silane coupling agent is an aminofunctional silane coupling agent chosen from the group consisting of N-(2-aminoethyl)-3-aminopropyltrimethoxysilane,(aminoethylaminomethyl) phenyltrimethoxysilane, N-(2-aminoethyl)-3-aminopropyl tris(2-ethylhexoxy) silane, 3-aminopropyltrimethoxysilane, trimethoxysilylpropyldiethylenetriamine, 3-aminopropyltrimethoxysilane, aminopropyltriethoxysilane, Bis(2-hydroxyethyl)-3-aminopropyltrimethoxysilane, and 4-aminobutyltriethoxysilane.

31. The composition of claim 30 wherein the silane coupling agent is N-(2-aminoethyl)-3-aminopropyltrimethoxysilane[, and the composition further comprises a mutual solvent for said disilyl crosslinker and coupling agent].

32. The composition of claim 4 wherein the silane coupling agent is a methacrylic functional coupling agent chosen from the group consisting of 3-methacryloxypropyltrimethoxysilane, and 2-methacryloxyethyldimethyl[3-trimethoxysilylpropyl]ammonium chloride.

33. The composition of claim 32 wherein the silane coupling agent is 3-methacryloxypropyl-trimethoxysilane[, and the composition further comprises a mutual solvent for said disilyl crosslinker and coupling agent].

34. The composition of claim 4 wherein the silane coupling agent is a epoxy functional coupling agent chosen from the group consisting of 3-glycidoxypropyltrimethoxysilane, and beta (3,4 epoxycyclohexyl) ethyltrimethoxysilane[, and where the composition further comprises a mutual solvent for said disilyl crosslinker and coupling agent].

35. The composition of claim 4 wherein the silane coupling agent is a vinyl functional coupling agent chosen from the group consisting of 3[2(vinyl benzylamino) ethylamino]propyltrimethoxysilane, triacetoxyvinylsilane, tris-(2-methoxyethoxy)vinylsilane, vinyltrimethoxysilane, and vinyl tris(t-butylperoxy)silane[, and where the composition further comprises a mutual solvent for said disilyl crosslinker and coupling agent].

36. The composition of claim 4 wherein the silane coupling agent is a halo-organic radical functional coupling agent chosen from the group consisting of 3-chloropropyltrimethoxysilane, 3-chloropropyltriethoxysilane, 1-trimethoxysilyl-2-(p,m-chloromethyl)pbenylethane.

37. The composition of claim 36 where the haloorganic radical is 3-chloropropyltrimethoxysilane[, and the composition further comprises a mutual solvent for said disilyl crosslinker and coupling agent].

38. The composition of claim 4 wherein the silane coupling agent is a mercapto functional coupling agent chosen from the group consisting of 3-mercaptopropylmethyltrimethoxysilane, and 3-mercaptopropylmethyldimethoxysilane[, and where the composition further comprises a mutual solvent for said disilyl crosslinker and coupling agent].

39. The composition of claim 10 wherein the silane coupling agent is an aminofunctional silane coupling agent chosen from the group consisting of N-(2-aminoethyl)-3-aminopropyltrimethoxysilane,(aminoethylaminomethyl) phenyltrimethoxysilane, N-(2-aminoethyl)-3-aminopropyl tris(2-ethylhexoxy) silane, 3-aminopropyltrimethoxysilane, trimethoxysilylpropyldiethylenetriamine, 3-aminopropyltrimethoxysilane, aminopropyltriethoxysilane, Bis(2-hydroxyethyl)-3-aminopropyltrimethoxysilane, and 4-aminobutyltriethoxysilane.

40. The composition of claim 39 wherein the silane coupling agent is N-(2-aminoethyl)-3-aminopropyltrimethoxysilane[, and the composition further comprises a mutual solvent for said disilyl crosslinker and coupling agent].

41. The composition of claim 10 wherein the silane coupling agent is a methacrylic functional coupling agent chosen from the group consisting of 3-methacryloxypropyltrimethoxysilane, and 2-methacryloxyethyldimethyl[3-tri-methoxysilylpropyl]ammonium chloride.

42. The composition of claim 41 wherein the silane coupling agent is 3-methacryloxypropyl-trimethoxysilane[, and the composition further comprises a mutual solvent for said disilyl crosslinker and coupling agent].

43. The composition of claim 10 wherein the silane coupling agent is an epoxy functional coupling agent chosen from the group consisting of 3-glycidoxypropyltrimethoxysilane, and beta (3,4 epoxycyclohexyl) ethyltrimethoxysilane[, and where the composition further comprises a mutual solvent for said disilyl crosslinker and coupling agent].

44. The composition of claim 10 wherein the silane coupling agent is a vinyl functional coupling agent chosen from the group consisting of 3[2(vinyl benzylamino) ethylamino]propy]trimethoxysilane, triacetoxyvinylsilane, and vinyl tris-(2-methoxyethoxy)vinylsilane, vinyltrimethoxysilane, and vinyl tris(t-butylperoxy)silane[, and where the composition further comprises a mutual solvent for said disilyl crosslinker and coupling agent].

45. The composition of claim 10 wherein the silane coupling agent is a halo-organic radical functional coupling agent chosen from the group consisting of 3-chloropropyltrimethoxysilane, and 3-chloropropyltriethoxysilane, 1-trimethoxysilyl-2-(p,m-chloromethyl)-phenyl-ethane[, and where the composition further comprises a mutual solvent for said disilyl crosslinker and coupling agent].

46. The composition of claim 45 where the haloorganic radical is 3-chloropropyltrimethoxysilane[, and the composition further comprises a mutual solvent for said disilyl crosslinker and coupling agent].

47. The composition of claim 10 wherein the silane coupling agent is a mercapto functional coupling agent chosen from the group consisting of mercaptopropyltrimethoxysilane, mercaptopropyltriethoxysilane, 3-mercaptopropylmethyltrimethoxysilane, and 3-mercaptopropylmethyldimethoxysilane[, and where the composition further comprises a mutual solvent for said disilyl crosslinker and coupling agent].

48. The composition of claim 8 wherein the silane coupling agent is an amino functional silane coupling agent chosen from the group consisting of N-(2-aminoethyl)-3-aminopropyltrimethoxysilane,(aminoethylaminomethyl) phenyltrimethoxysilane, N-(2-aminoethyl)-3-aminopropyl tris(2-ethylhexoxy) silane, 3-aminopropyltrimethoxysilane, trimethoxysilylpropyldiethylenetriamine, 3-aminopropyltrimethoxysilane, aminopropyltriethoxysilane, Bis(2-hydroxyethyl)-3-aminopropyltrimethoxysilane, and 4-aminobutyltriethoxysilane.

49. The composition of claim 48 wherein the silane coupling agent is N-(2-aminoethyl)-3-aminopropyltrimethoxysilane[, and the composition further comprises a mutual solvent for said disilyl crosslinker and coupling agent].

50. The composition of claim 8 wherein the silane coupling agent is a methacrylic functional coupling agent chosen from the group consisting of 3-methacryloxypropyltrimethoxysilane, and 2-methacryloxyethyldimethyl[3-trimethoxysilylpropyl]ammonium chloride.

51. The composition of claim 50 wherein the silane coupling agent is 3-methacryloxypropyl-trimethoxysilane[, and the composition further comprises a mutual solvent for said disilyl crosslinker and coupling agent].

52. The composition of claim 8 wherein the silane coupling agent is a epoxy functional coupling agent chosen from the group consisting of 3-glycidoxypropyltrimethoxysilane, and beta (3,4 epoxycyclohexyl) ethyltrimethoxysilane[, and where the composition further comprises a mutual solvent for said disilyl crosslinker and coupling agent].

53. The composition of claim 8 wherein the silane coupling agent is a vinyl functional coupling agent chosen from the group consisting of 3[2(vinyl benzylamino) ethylamino]propyltrimethoxysilane, triacetoxyvinyisilane, tris-(2-methox yethoxy)vinylsilane, vinyltrimethoxysilane, and vinyl tris(t-butylperoxy)silane[, and where the composition further comprises a mutual solvent for said disilyl crosslinker and coupling agent].

54. The composition of claim 8 wherein the silane coupling agent is a halo-organic radical functional coupling agent chosen from the group consisting of 3-chloropropyltrimethoxysilane, and 3-chloropropyltriethoxysilane, 1-trimethoxysilyl-2-(p,m-chloromethyl)-phenyl-ethane[, and where the composition further comprises a mutual solvent for said disilyl crosslinker and coupling agent].

55. The composition of claim 54 where the haloorganic radical is 3-chloropropyltrimethoxysilane.

56. The composition of claim 8 wherein the silane coupling agent is a mercapto functional coupling agent chosen from the group consisting of mercaptopropyltrimethoxysilane, mercaptopropyltriethoxysilane, 3-mercaptopropylmethyltrimethoxysilane, and 3-mercaptopropylmethyldimethoxysilane[, and where the composition further comprises a mutual solvent for said disilyl crosslinker and coupling agent].

* * * * *